UNITED STATES PATENT OFFICE.

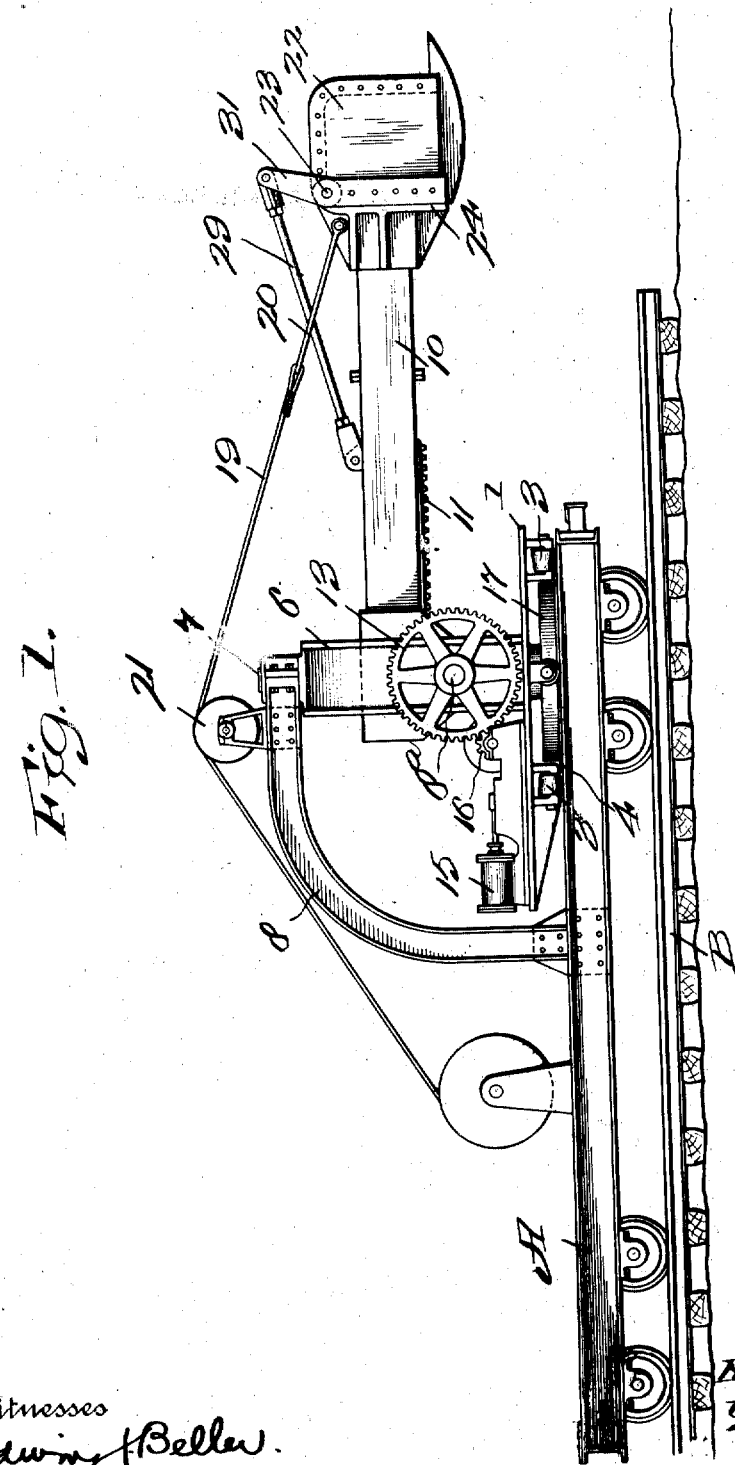

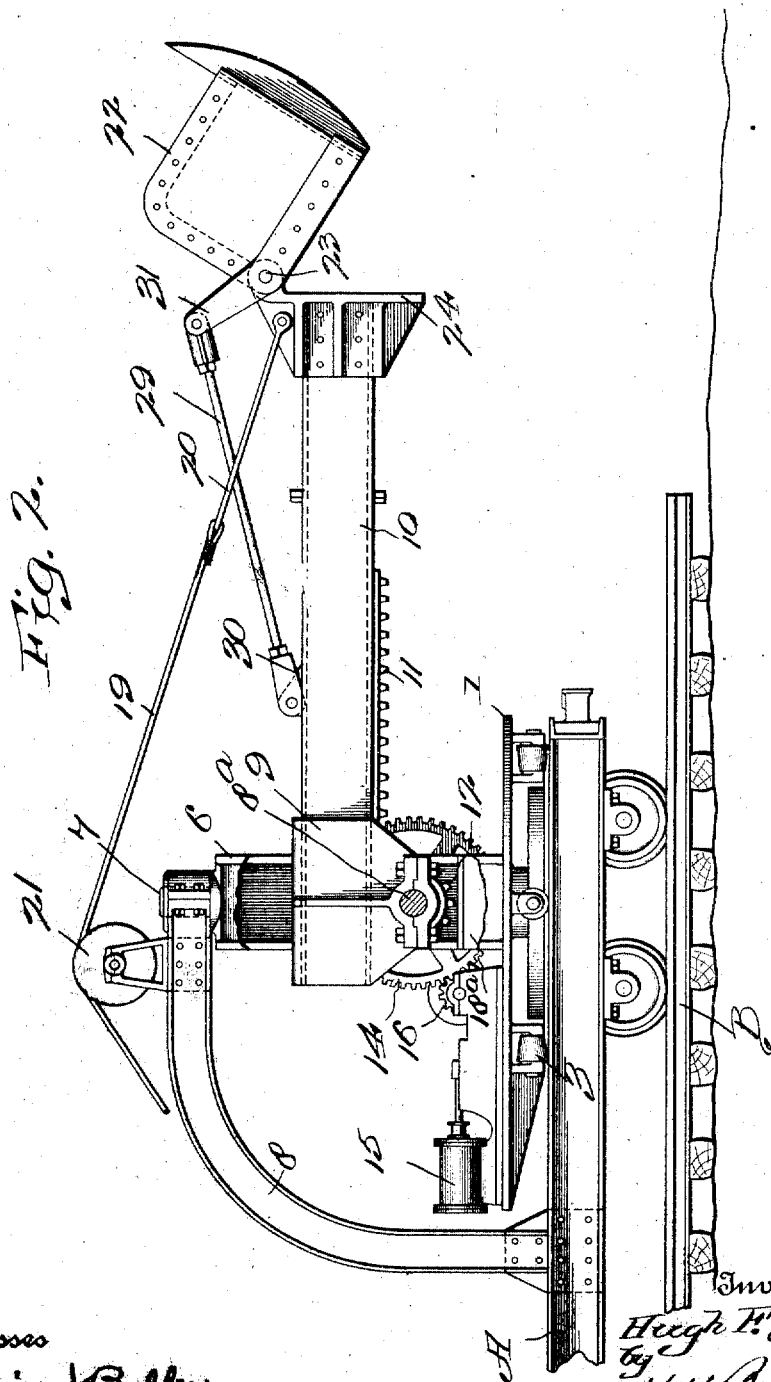

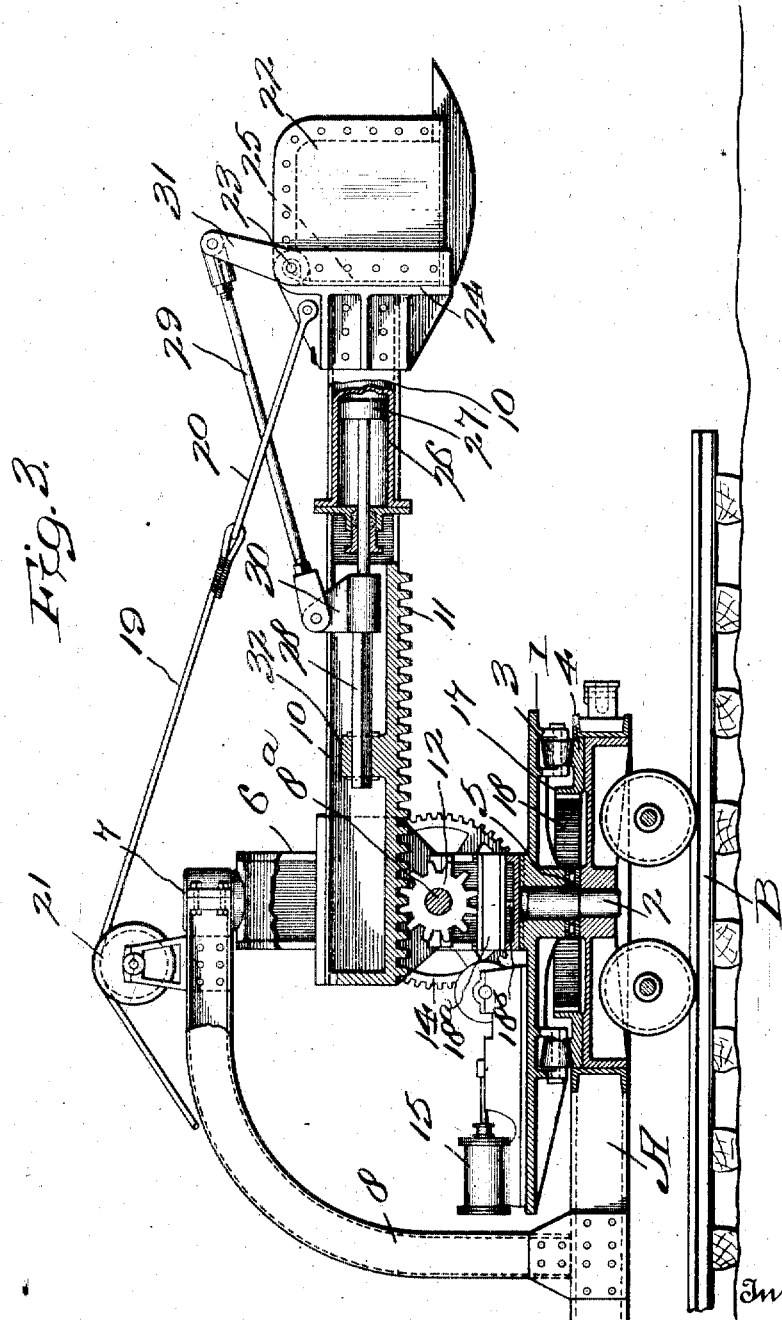

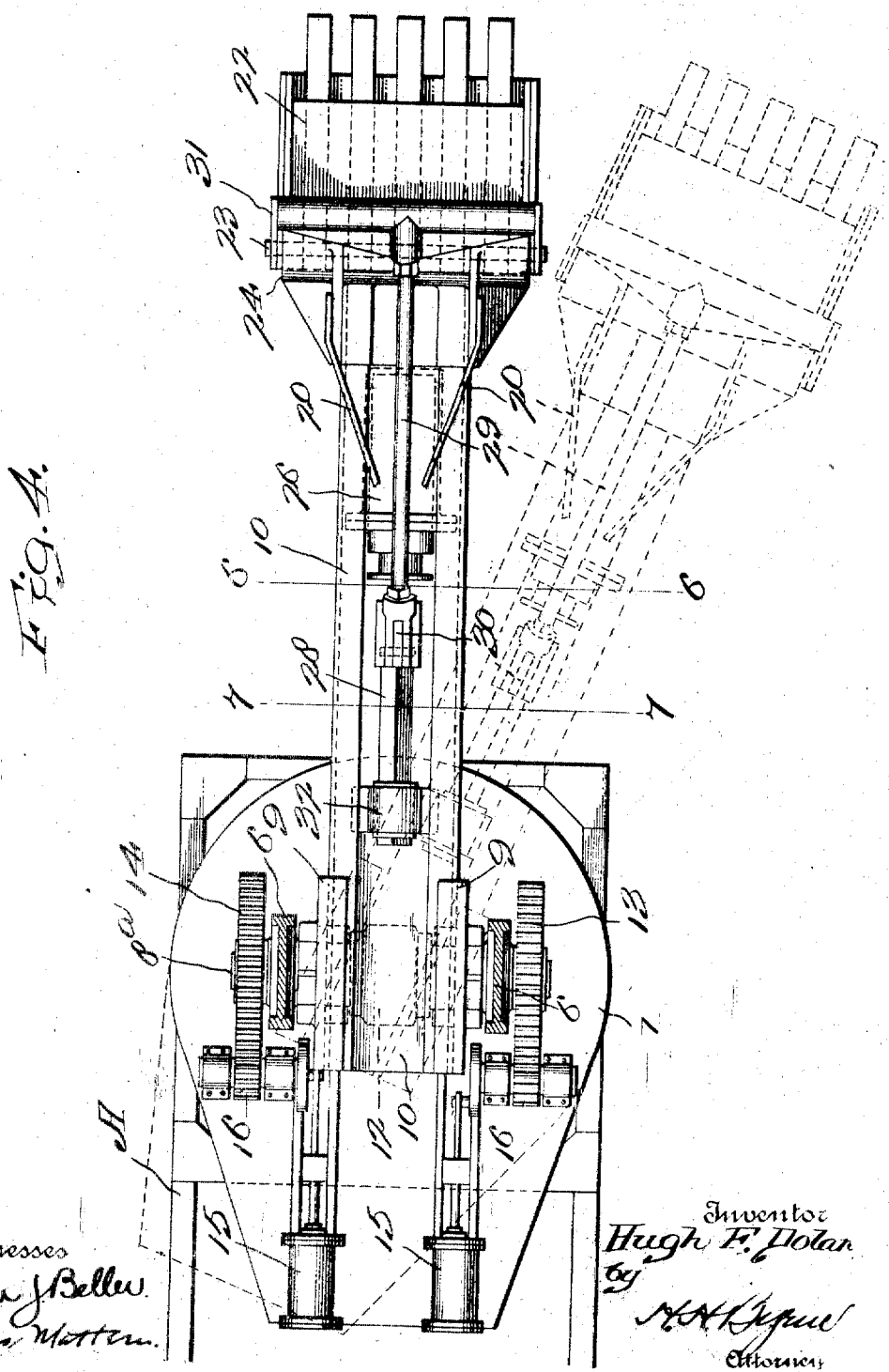

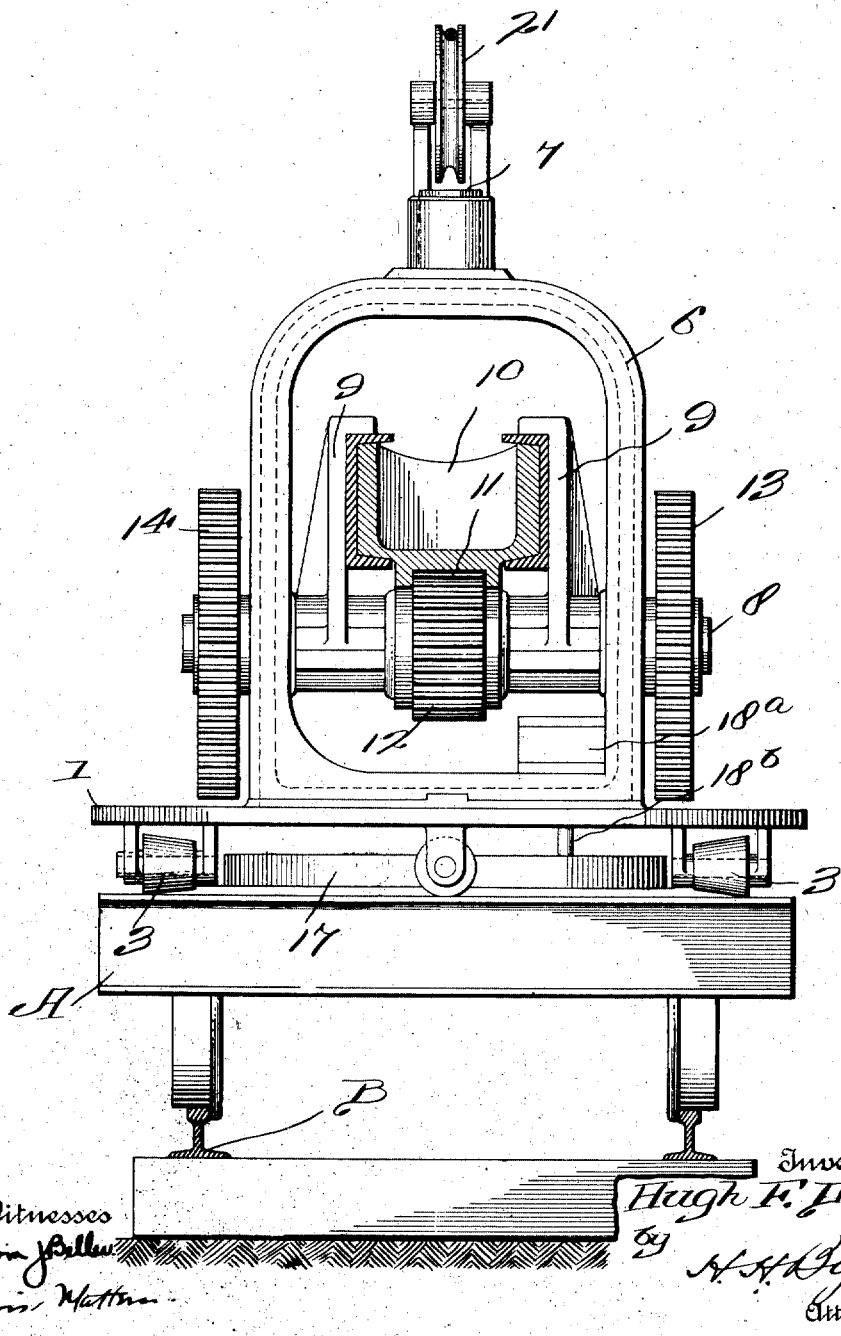

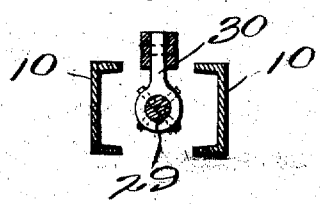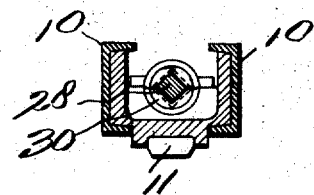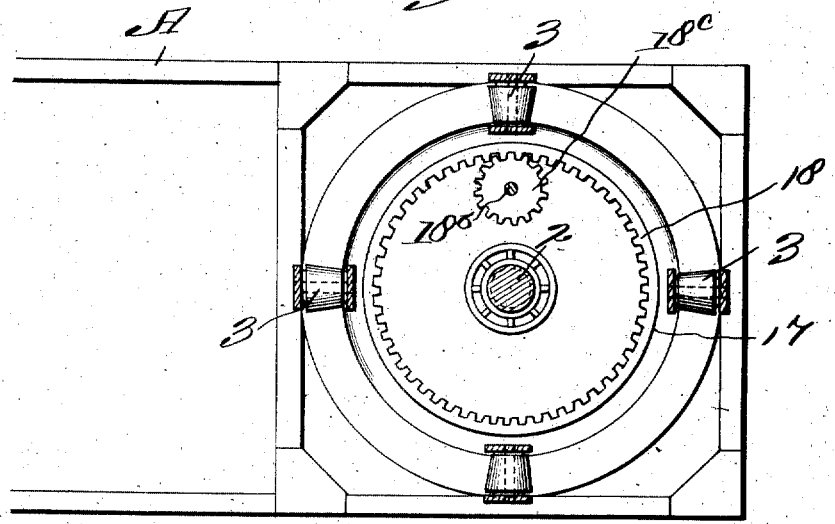

HUGH F. DOLAN, OF POTTSVILLE, PENNSYLVANIA.

EXCAVATOR AND LOADER.

1,234,304.   Specification of Letters Patent.   Patented July 24, 1917.

Application filed November 17, 1914. Serial No. 872,566.

*To all whom it may concern:*

Be it known that I, HUGH F. DOLAN, a citizen of the United States of America, residing at Pottsville, in the county of Schuylkill and State of Pennsylvania, have invented certain new and useful Improvements in Excavators and Loaders, of which the following is a specification.

The present invention relates to excavators and loaders, and consists in the combinations and arrangements of elements hereinafter disclosed and set forth in the accompanying claims.

The invention has for its purpose to provide an excavator and loading machine which will be positive and accurate in operation, one which will readily respond through a convenient system of control, and one wherein the construction will ably withstand heavy and rough usage.

A further purpose of the invention is to provide an excavator serviceable with either electric, hydraulic, compressed air or steam power and capable of retracting the shovel carrying arm whereby to unload the shovel in close proximity to the position of working, and also to enable operating in otherwise restricted limits.

With these and other objects in view, the invention consists in the arrangement and combination of parts hereinafter claimed and, while the invention is not restricted to the exact details shown and described, still, for the purpose of disclosure, reference is had to the accompanying drawings, in which like reference characters designate the same parts in the several views.

The invention disclosed herein is proposed as an improvement over the excavator and loader shown in my U. S. Patent No. 1,064,456 and dated June 10, 1913.

Figure 1 is a side elevational view of the machine complete.

Fig. 2 is a similar view showing the shovel in position for dumping.

Fig. 3 is a side elevational view, partly in section, and disclosing the excavator and loader *per se.*

Fig. 4 is a top plan view of Fig. 2.

Fig. 5 is a front elevational view of the machine with parts in section and parts omitted for clearness.

Figs. 6 and 7 are transverse sectional views taken on the lines 6—6 and 7—7 respectively of Fig. 4, and Fig. 8 is a top plan view showing the platform supporting means.

Referring to the construction in further detail the same consists of an ordinary flat car A adapted to be secured to the rails B in any appropriate manner for stabilizing the machine. At one end the car A has mounted thereon a platform 1 revoluble about the shaft 2 and having a plurality of tapered rollers 3 that travel on the annular track 4. A series of plain roller thrust bearings 5 are located immediately surrounding the shaft 2. A yoke frame 6 is mounted centrally of the platform 1 and has a pivotal bearing 7 with the fixed arm 8 on the car A.

A shaft $8^a$ is mounted on the yoke frame 6 and has fulcrumed thereon the shovel arm support or frame comprising two similar parts 9 forming opposed guideways (see Fig. 5). The shovel arm 10 is mounted to have lateral reciprocating movement within said frame, and to effect which said arm carries a rack 11 on its underside that meshes with the pinion 12 secured on the shaft $8^a$.

The annular track 4 is constructed with an upturned and annular flange 17 having an internal rack 18 designed to be engaged by suitable means driven from the engine 15 for rotating the platform together with the shovel arm as will be understood. In the present instance a Dake engine $18^a$ mounted on the yoke frame 6 has a pinion $18^c$ on its shaft $18^b$, meshing with the rack 18 to rotate the platform. It will be appreciated that electric power may be used where advisable in lieu of steam.

The vertical or lifting and lowering movements of the shovel carrying arm are effected by means of a cable 19 that connects with the outer end of said arm through a yoke 20, and passes over a grooved pulley 21 to the winding drum mounted on the car.

The shovel 22 is fulcrumed at 23 to the head 24 which is secured on the outer end of the arm 10 that reciprocates through the yoke frame 6 as heretofore described. Said shovel has a hinged door 25 adapted to be operated in any suitable manner, and the $10^b$ cutting edge of the shovel is projected forwardly. The piston in the cylinder 26 is under such control of the operator that the cutting edge of the bucket may be presented to the material to be loaded at the angle most advantageous for the work to be performed. By means of such control, this angle may be varied and fixed at any point within the travel of the bucket on its fulcrum, and may be changed and fixed at any point within the limit of its movement.

The shovel is adapted to be swung or tipped on its fulcrum 23 to receive or release a load by means of motive power carried on and movable with the shovel supporting arm 10. Said motive power consists of a cylinder 26 and piston 27 operable therein and having its rod 28 connecting with the shovel through a link 29 engaging a cross-head 30 and an arm 31 on said piston rod and shovel respectively. A bearing 32 provides a reinforcement and guide for the piston rod 28 as shown in Fig. 3.

From the foregoing it will be readily seen that the shovel 22 may be driven into the embankment or other material to be excavated under the maximum driving power of the engine.

The shovel carrying arm 10 is fulcrumed on the pinion 12 engaging the rack 11 and, since said arm is adapted to reciprocate through the yoke 6, it will be seen that the fulcrum of said shovel carrying arm is variable. The shovel arm may therefore be raised or lowered at substantially any position of its length, all in accordance with the work being performed.

The cycle of operation is as follows: The pinion 12 meshing with the rack 11 of the shovel arm 10 is actuated from the engines 15 through pinions 16, 13 and 14, and this application of power to said shovel carrying arm forces the teeth of the shovel into the material to be loaded and the tipping action imparts to it a circular motion which may be coincident with hoisting it through the material by the cable 19 or independent of it. The completion of the tipping action places the bucket in position for emptying. Stress is laid upon the tipping motion while filling as essential for the successful use of the machine. This feature of the machine accomplishes the same result in a restricted location as that attained by the ordinary steam shovel wherein the filling is entirely due to the circular motion of the shovel against the material being excavated through hoisting the shovel arm which is fulcrumed at one end. In the small space available in a tunnel heading the head-room for such action cannot be had while with the present apparatus, the desired result is accomplished by use of the independent cylinder which fulcrums the shovel while it is being hoisted, or before that period, if the material is of a nature to allow it.

The degree of angle between the shovel carrying arm 10 and the hoisting cable 19 is, in the present disclosure, too small, but it will be understood, of course, that the disclosure is for illustrative purposes only, and that this angle may be of the degree required under working conditions.

With the construction described and disclosed herein it will be apparent that the excavator may be conveniently operated at any desired angle and that the successive digging and carrying operations of the shovel may be effected with great rapidity.

While the forms of the invention herein shown and described are what are believed to be preferable embodiments thereof, it is nevertheless to be understood that various forms and modifications thereof may be had without departing from the spirit and scope of the invention as claimed.

What is claimed as new is:

1. In an excavator and loader, the combination of a frame, a shaft journaled on the frame, a single arm fulcrumed on and lying in a plane above said shaft and shiftable thereon to position the machine with respect to the work, a shovel fulcrumed on the arm and having a cutting edge projecting forwardly, means for shifting said arm, means for swinging the arm comprising an upwardly and rearwardly disposed cable, and means carried by the arm for turning the shovel upwardly on its fulcrum, substantially as set forth.

2. In an excavator and loader, the combination of a frame, a shaft journaled on the frame, a pinion on said shaft, an arm having a rack fulcrumed on the pinion and shiftable thereon to position the machine with respect to the work, means for operating said pinion to shift the arm, a shovel fulcrumed on the arm and having a cutting edge projecting forwardly, means for swinging the arm on the pinion comprising an upwardly and rearwardly disposed cable, and means carried wholly by the arm for turning the shovel upwardly on its fulcrum, substantially as set forth.

3. In an excavator and loader, the combination of a frame, a shaft journaled on the frame, a pinion on said shaft, an arm having a rack fulcrumed on the pinion and shiftable thereon to position the machine with respect to the work, means for operating said pinion to shift the arm, a shovel fulcrumed on the arm, an upwardly and rearwardly disposed cable for swinging the arm, a cylinder mounted on the arm, a piston operable in the cylinder, and a connection between said piston and shovel to turn the latter upwardly on its fulcrum, substantially as set forth.

4. In an excavator and loader, the combination of, a horizontally rotatable frame, a shaft journaled on the frame, a pair of arm supports having guide-ways fulcrumed on said shaft, a pinion mounted on the shaft between said arm supports, a shovel carrying arm mounted within said guide-ways and having a rack engaging with said pinion, a shovel fulcrumed on the arm, means for operating the pinion to shift the arm on its fulcrum to position the machine with respect to the work, means for swinging the arm with said arm supports on said shaft comprising an upwardly and rearwardly disposed cable, and means carried wholly by the arm for turning the shovel upwardly on its fulcrum, substantially as set forth.

In testimony whereof I affix my signature in presence of two witnesses.

HUGH F. DOLAN.

Witnesses:
F. S. FREILER,
RAYMOND LEDDY.